United States Patent [19]
Kraemer

[11] 3,801,444
[45] Apr. 2, 1974

[54] PRESSURE VESSEL IN PARTICULAR FOR A NUCLEAR REACTOR

[75] Inventor: Wieland Kraemer, Vasteras, Sweden

[73] Assignee: Aktiebolaget Atomenergi, Stockholm, Sweden

[22] Filed: Nov. 19, 1971

[21] Appl. No.: 200,460

[30] Foreign Application Priority Data
Dec. 2, 1970 Sweden.............................. 16340/70

[52] U.S. Cl......................... 176/37, 176/87, 52/224
[51] Int. Cl.............................................. G21c 13/10
[58] Field of Search............ 176/37, 38, 87; 52/223, 52/224

[56] References Cited
UNITED STATES PATENTS

| | | | |
|---|---|---|---|
| 3,444,725 | 5/1969 | Chaue................................... | 176/38 |
| 3,438,857 | 4/1969 | Sulzer................................... | 176/87 |
| 3,318,780 | 5/1967 | Bohmann et al...................... | 176/87 |
| 3,258,403 | 6/1966 | Malay................................... | 176/37 |
| 3,322,141 | 5/1967 | Gans, Jr. et al...................... | 176/38 |
| 3,288,998 | 11/1966 | Press, Jr.............................. | 176/87 |
| 3,320,969 | 5/1967 | Gordon................................. | 176/87 |

FOREIGN PATENTS OR APPLICATIONS

| | | | |
|---|---|---|---|
| 258,474 | 12/1963 | Australia............................. | 176/87 |
| 6,702,064 | 8/1967 | Netherlands......................... | 176/37 |

Primary Examiner—Harvey E. Behrend
Attorney, Agent, or Firm—Pierce, Scheffler & Parker

[57] ABSTRACT

The invention is concerned with a pressure vessel of pre-stressed concrete, having an interior steel lining. A plurality of passages are provided in the concrete. If a leak occurs, the leaking pressurized fluid escapes through the porous concrete to said passages. The presence of the pressurized fluid in said passages can be checked by means of pressure gauges. The passages are preferably arranged as two separate sets of passages, the passages of one set forming an angle with those of the other set, making it possible to locate a leak fairly well.

4 Claims, 6 Drawing Figures

PATENTED APR 2 1974 3,801,444

PRESSURE VESSEL IN PARTICULAR FOR A NUCLEAR REACTOR

The present invention relates to a pressure vessel of the kind comprising a container of pre-stressed concrete and a sealing steel liner on the inside wall of the container. The pressure vessel is intended in particular for use in a nuclear reactor but can be used for other applications, for example as the reactor for chemical reactions.

If the steel liner on the inside wall of the container should spring a leak, then the fluid contained in the pressure vessel will penetrate to the porous concrete. Because the concrete wall has an appreciable thickness, the fluid can build up a pressure there which may increase the loading on the pre-stressing cables with the result that the pressure vessel fails. Considering a pressure vessel for a neclear reactor, this kind of occurrence could mean that the leaking radioactive fluid could contaminate the whole concrete mass and possibly the reactor environment if the medium were to penetrate out through the concrete.

The main object of the invention is to create a pressure vessel in which damage to the steel liner does not lead to the build-up of a dangerous pressure in the concrete wall. Another object of the invention is to create a pressure vessel in which any leaking pressurized fluid is maintained under full control so that it cannot penetrate out to the environement in an uncontrolled manner. Another object of the invention is to provide a pressure vessel in which an indication is given if the pressurized fluid starts to leak out through a crack in the steel liner.

The pressure vessel in accordance with the invention is characterized in that in the concrete, adjacent the steel liner, a plurality of closed passages with porous or perforated walls are provided, into which the pressurized fluid from the container can penetrate in the event of a leak occurring in the steel liner; in that discharge pipes are arranged to connect the passages on the one hand to indicating devices, for indicating the presence of the pressurized fluid in the passages, and on the other hand to shut-off members by means of which the leaking pressurized fluid can be held back or released from the passages, as required. One or more discharge pipes can be connected to each passage and the discharge pipes can have fluid-tight walls.

The passages can be produced by arranging cores in the formwork used to mould the concrete, the cores being removed when the concrete has hardened. Alternately, concrete tubes or perforated steel tubes can be laid in the formwork, these tubes being allowed to remain in the concrete.

The passages shall be located close to the steel liner. A leak in the steel liner then means that any pressure developed in the concrete is channelled predominantly to the passages, and no appreciable pressure develops in the concrete outside the passages. To achieve this result, the spacing between two adjacent passages should not be too large. A pressure vessel with longitudinal passages should have at least twelve such passages, or in other words the interval between two adjacent passages should not exceed half the internal radius of the pressure vessel. This is also a suitable minimum spacing between passages extending circumferentially around the pressure vessel.

The indicating devices will conveniently be made of pressuresensitive elements, which detect the pressure in the passages. Alternatively, the indicating devices can for example be constituted by temperature- sensitive elements which indicate a temperature rise in the passages, or means for indicating the presence of a radioactive substance in the passages. Indicating devices can be arranged in the discharge pipes for each passage or group of passages.

The pressurized fluid which escapes through a leak in the steel liner would generally flow to the nearest passage. With the help of the indicating devices, it is then possible to get an idea of where the leak is located. The accuracy of this detection can be increased if two groups of passages are provided so that the passages in one group form an angle with those in the other. If an indication is then obtained from one passage in each group, then the leak will obviously be located in the area where the two passages intersect one another. One group can be made offlongitudinal passages and the other of circumferential passages. Another possibility is to arrange for the passages to extend helically around the pressure vessel, one group describing a right-hand helix and the other a left-hand helix. The fluidtightness of the pressure vessel can be tested in the indicated manner not only during operation but also, for example, during acceptance tests.

The shut-off members will advantageously be constituted by valves of some kind, for example safety valves which open automatically when the pressure in the passages has reached a predetermined level. Alternatively, the valves can be opened manually. In a nuclear reactor, they will then conveniently be remote control operated. In the event of a leak in the steel liner, it is best to allow a certain pressure to develop in the passage or passages located closest to the leak, before opening the valves. The pressure passages are perforated, and the escaping fluid is therefore distributed in the concrete over the whole length of the passage. This prevents any dangerous pressure build-up in the zone nearest the leak.

The discharge pipes from the passages will conveniently be so disposed that they open into a common chamber. In the case of vertical discharge pipes this common chamber will conveniently be located under the pressure vessel. In a nuclear reactor in which the pressurized fluid is constituted by water or steam, said common chamber will conveniently be connected with a so-called pressure-suppression chamber, that is to say the escaping hot water or steam is led to a basin containing cold water, thus preventing the development of a dangerous steam pressure.

The passages should be located close to the steel liner, and preferably between the steel liner and the innermost prestressing cables. It is possible, however, for the pre-stressing cables to extend through the passages, so that, for example, the passages for collecting the escaping pressurized fluid are identical with those used for the innermost pre-stressing cables.

The invention will be explained in more detail hereinafter making reference to the attached drawing.

In the Figures, similar portions are designated by the same reference numerals.

Figure 1:
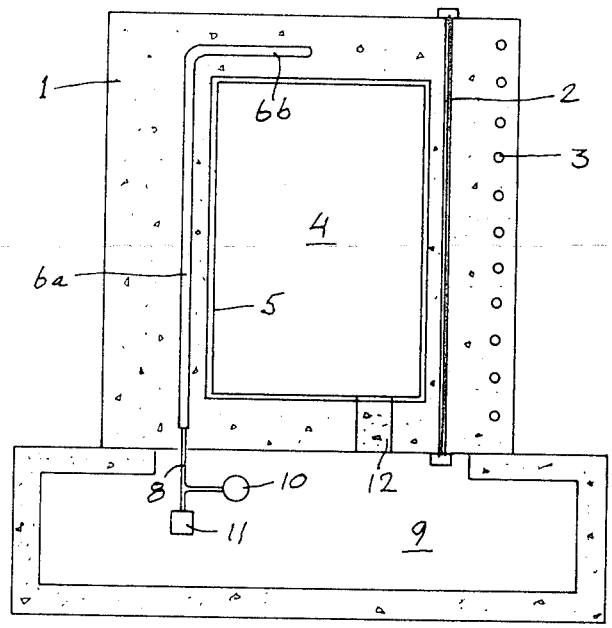
FIGS. 1–5 illustrate simplified vertical sections through five embodiments of the pressure vessel in accordance with the invention.

The pressure vessel of FIG. 1 comprises a concrete container 1 pre-stressed by longitudinal cables 2 and circumferential cables 3. The internal wall of the container is clad with a steel liner 5. Around the cavity 4 of the container, there are arranged a plurality of passages 6 with permeable walls. The passages consist of an axial section 6a and a radial section 6b extending close to the upper end of the steel liner up to a point near the axis of the cylindrical pressure vessel. Discharge pipes 8 are arranged to extend from the passages 6 down into a container 9 below the compression vessel itself. Coupled to the discharge pipes 8 are pressure-sensitive elements 10 which, through systems which have not been shown, can be read in a control room. The discharge pipes 8 are closed up by means of safety valves 11 designed to open at a predetermined pressure.

The container 9 can be given a size such that with a maximum rupture in the steel liner 5 it can receive the whole of the escaping pressurized fluid without any risk of a dangerous pressure developing. The container 9 can be designed as a basin for cold water so that it functions as a pressure-suppression chamber if the pressurized fluid is steam or hot water.

A removable plug 12 in the bottom of the pressure vessel gives access to the interior of the pressure vessel.

Figure 2:
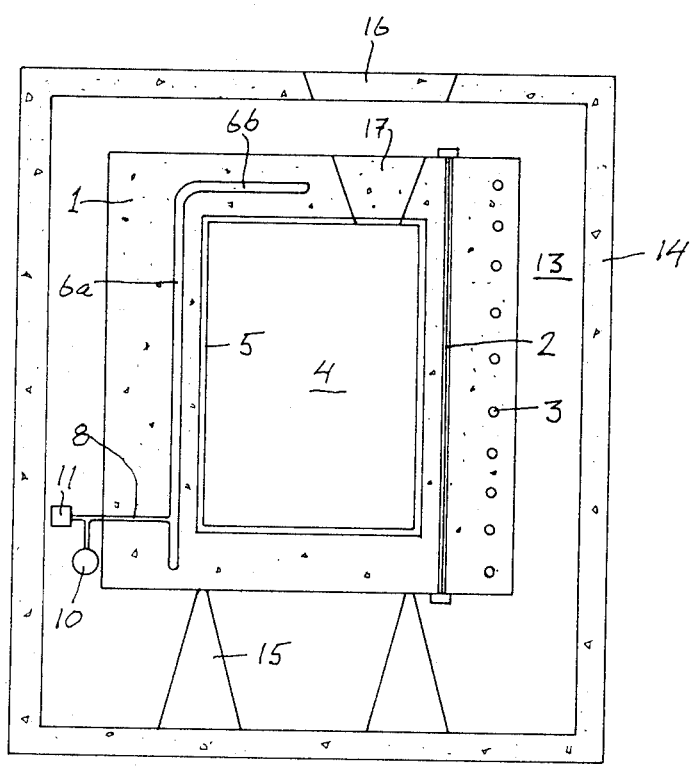

The pressure vessel 1 of FIG. 2 is situated upon supports 15 inside a reinforced concrete containment 14. Plugs 16 and 17 in the top walls of the containment and the pressure vessel give access to the interior of the pressure vessel. The discharge pipes 8 from the passages 6 extend through the cylindrical side wall of the pressure vessel. The elements 10 and the valves 11 are situated in the annular space between the pressure vessel and the containment. The lower portion of the containment 14 may be filled with cold water, to form a pressure-suppression chamber. Alternatively, the containment may communicate with a separate pressure-suppression chamber.

Figure 3:
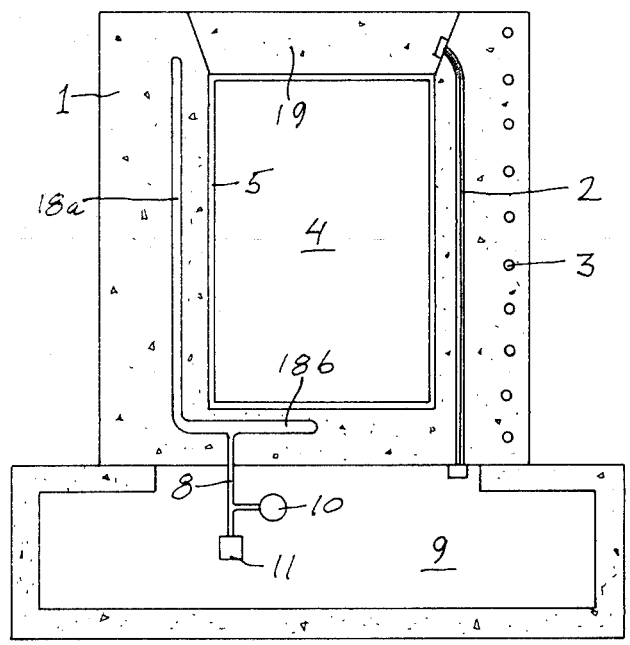

In the embodiment illustrated in FIG. 3 the top wall of the pressure vessel 1 consists of a removable lid or cover 19. The passages 18 for receiving leaking pressurized fluid consists of axially extending portions 18a and of portions 18b which extend radially in the bottom wall of the pressure vessel. The discharge pipes 8 are connected to said radial portions 18b. The elements 10 and the valves 11 are situated in the chamber 9, as is the case in the embodiment of FIG. 1.

Figure 4:
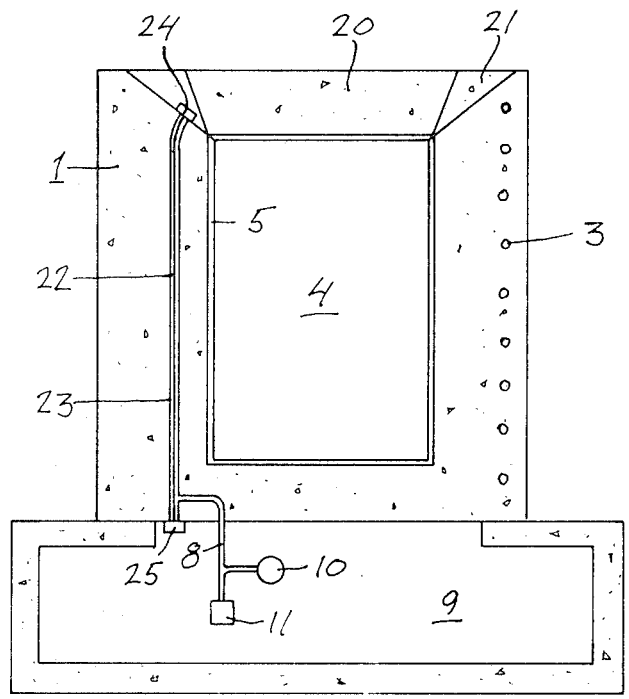

In the embodiment illustrated in FIG. 4 the top wall of the pressure vessel 1 consists of a removable cover 20 which is fastened to the pressure vessel by means of fastening members 21. The axially extending pre-stressing cables 22 are fastened to anchoring members 24, 25 of the top and bottom of the pressure vessel. The canals 23 for these pre-stressing cables 22 communicate with the discharge pipes. Consequently, the canals 23 serve the double purpose of containing the pre-stressing cables 22 and receiving leaking pressurized fluid.

Figure 5:
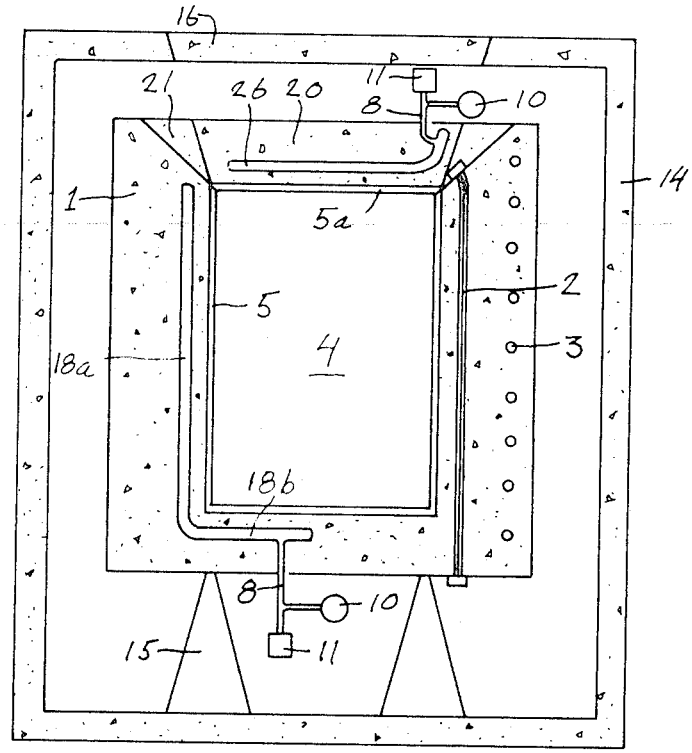

The pressure vessel 1 of FIG. 5 is situated in a containment 14 of the type described with reference to FIG. 2. The cover 20, which is of the type described with reference to FIG. 4, contains passages 26 with porous walls. Said passages 26 receive any pressurized fluid which leaks through the cover 20 as a result of a damage to the steel lining 5a covering the interior surface of the cover 20. The passages 26 communicate via discharge pipes 8 with pressure-sensitive elements 10 and safety valves 11 situated in the space between the top of the pressure vessel and the containment 14.

Figure 6:
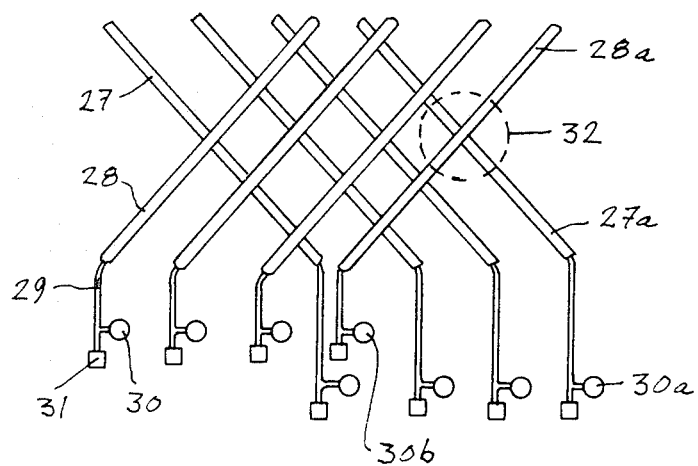
FIG. 6 illustrates how two sets of passages can be arranged to make an angle with one another.

FIG. 6 schematically illustrates how a group of mutually parallel passages 27 can be arranged to form an angle with another group of mutually parallel passages 28. The passages in the two groups intersect one another at a certain interval in each case and therefore do not communicate with one another. Each passage is connected through a discharge pipe 29 to a pressure gauge 30 and a shut-off device 31, for example a safety valve. If a leak occurs in the area indicated 32, the leaking pressurized fluid is likely to escape to the passages 27a and 28a, and the increased pressure in these two passages is indicated by the pressure gauges 30a and 30b. Consequently, the leaking area can easily be located.

What is claimed is:

1. A pressure vessel for a nuclear reactor, comprising
   a container consisting of pre-stressed concrete;
   a steel lining on the inside wall of said container;
   a plurality of channels in said pre-stressed concrete, said channels having porous walls for receiving fluid migrating through the pre-stressed concrete in the event of a leak in the steel lining;
   a plurality of pipes each pipe having one end communicating with said channels and the other end situated in a common chamber;
   a plurality of indicating members communicating with said channels and adapted to indicate the presence of fluid in said channels;
   a plurality of relief valves on said pipes in said common chamber to release fluid into said common chamber at a pre-determined pressure; and
   a water-containing pressure-suppression tank in communication with said common chamber.

2. A pressure vessel as defined in claim 1, in which the channels are arranged in at least two groups, the channels in one group overlapping the channels of the other group, without communicating with the latter, and the channels in one group making an angle with the channels in the other group in order to enable the rupture in the steel liner to be pinpointed.

3. A pressure vessel as claimed in claim 1, in which the channels also contain the cables for pre-stressing the concrete.

4. A pressure vessel as claimed in claim 1, characterized in that the indicating devices consist of pressure-sensitive elements which are connected to each channel or group of channels.

* * * * *